(12) United States Patent
Geppert et al.

(10) Patent No.: US 8,020,814 B2
(45) Date of Patent: Sep. 20, 2011

(54) CLAMP FOR SECURING A TUBULAR OR HOSE-SHAPED OBJECT

(75) Inventors: Helmut Geppert, Karlstein (DE); Frank Schmidt, Langenselbold (DE); Michael Sommer, Büdingen (DE)

(73) Assignee: Norma Germany GmbH, Maintal (DE)

( * ) Notice: Subject to any disclaimer, the term of this patent is extended or adjusted under 35 U.S.C. 154(b) by 990 days.

(21) Appl. No.: 11/796,500

(22) Filed: Apr. 27, 2007

(65) Prior Publication Data

US 2007/0257161 A1 Nov. 8, 2007

(30) Foreign Application Priority Data

May 3, 2006 (DE) .................. 10 2006 020 407

(51) Int. Cl.
*F16L 3/08* (2006.01)
(52) U.S. Cl. ..................... 248/74.3; 248/74.1
(58) Field of Classification Search .............. 248/74.1, 248/74.3, 74.5, 68.1, 73; 174/163 R; 24/16 PB, 24/16 R, 20 R, 279
See application file for complete search history.

(56) References Cited

U.S. PATENT DOCUMENTS

| 2,338,006 | A | | 12/1943 | Morehouse | |
|---|---|---|---|---|---|
| 2,427,770 | A | * | 9/1947 | Ellinwood | 248/74.3 |
| 2,972,461 | A | * | 2/1961 | Balbach et al. | 248/68.1 |
| 3,906,592 | A | * | 9/1975 | Sakasegawa et al. | 248/68.1 |
| 3,995,795 | A | | 12/1976 | Hogan | |
| 4,441,677 | A | | 4/1984 | Byerly | |
| 4,790,502 | A | * | 12/1988 | Saegusa | 248/74.1 |
| 5,028,021 | A | | 7/1991 | Sugiyama et al. | |
| H0968 | H | | 10/1991 | Moyles | |
| 5,172,879 | A | * | 12/1992 | Calmettes et al. | 248/74.3 |
| 5,377,940 | A | * | 1/1995 | Cabe et al. | 248/74.3 |
| 5,511,288 | A | * | 4/1996 | McAndrews et al. | 24/16 R |

FOREIGN PATENT DOCUMENTS

| CA | 651497 XY | 10/1962 |
|---|---|---|
| DE | 38 08 334 | 8/1989 |
| DE | 3804996 Y | 8/1989 |
| DE | 38 04 996 | 9/1990 |
| DE | 202004013043 XY | 10/2004 |
| GB | 573 708 | 11/1943 |
| GB | 589319 Y | 6/1947 |
| WO | 02/02980 | 1/2002 |

* cited by examiner

*Primary Examiner* — Gwendolyn W Baxter
(74) *Attorney, Agent, or Firm* — Lucas & Mercanti, LLP; Klaus P. Stoffel

(57) ABSTRACT

A clamp for securing a tubular or hose-shaped object on a support. The clamp includes a clamp jacket having first and second ends, wherein a first leg protrudes from the first end of the clamp jacket and a second leg projects from the second end of the clamp jacket. The first leg has a lug which in the open state protrudes in the direction of the second leg. The second leg includes a fastening section which can be inserted into a gap between the lug and a neighboring portion of the first leg located opposite the lug, wherein, in the closed state of the clamp, the lug is plastically deformed toward the outer side of the fastening section facing away from the first leg.

21 Claims, 5 Drawing Sheets

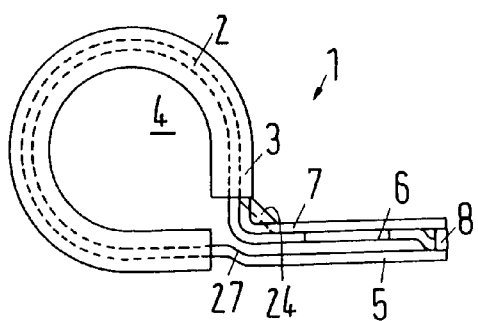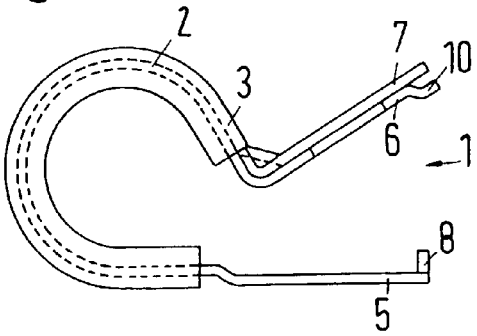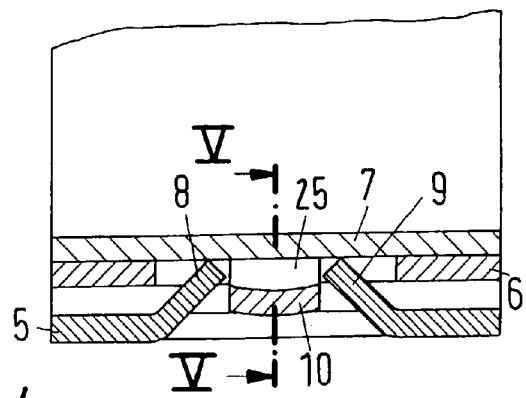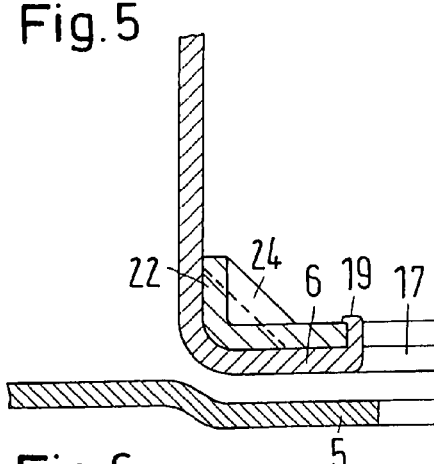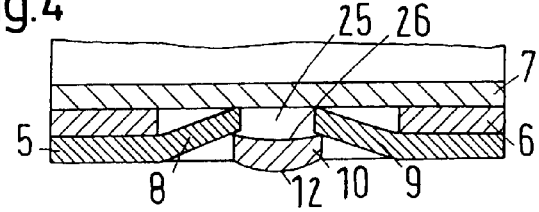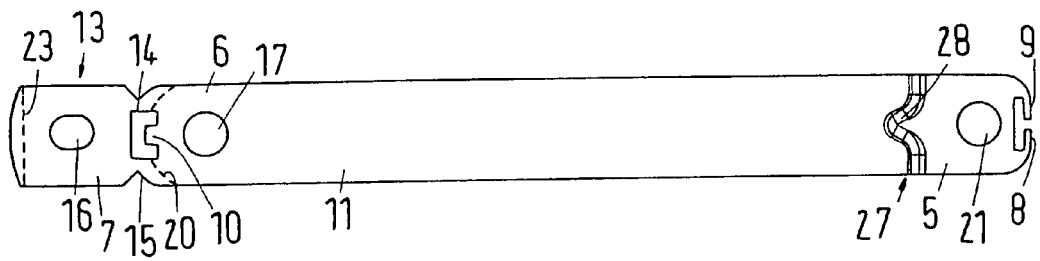

CLAMP FOR SECURING A TUBULAR OR HOSE-SHAPED OBJECT

BACKGROUND OF THE INVENTION

1. Field of the Invention

The present invention relates to a clamp for securing a tubular or hose-shaped object on a support. The clamp includes a clamp jacket having first and second ends, wherein a first leg protrudes from the first end of the clamp jacket and a second leg projects from the second end of the clamp jacket.

2. Description of the Related Art

A clamp of the above-described type is disclosed, for example, in DE 38 08 334 C1. The clamp jacket is curved in a C-shaped manner and encloses a receiving chamber in which can be placed a pipe, a hose or the like object. The two legs are then placed one on top of the other, so that the clamp including the pipe, hose or the like placed therein can be fastened to a support, for example, a girder, a ceiling, a wall, a housing or the like. The two legs have coinciding through-holes through which a fastening element, for example, a screw, can be guided.

In order to be able to secure the clamp on the tubular or hose-shaped object already before the assembly on the support, this known clamp can be preliminarily secured. For this purpose, the clamp has a locking mechanism. The locking mechanism includes a resilient lug which is bent into a S-shape and is mounted on one leg, wherein the other leg can engage with its free end face behind the resilient lug. After the lugs are locked together, the clamp jacket rests under a certain tension against the tubular or hose-shaped object, so that the clamp not be either turned or axially displaced on this object.

The above-described clamp has been found useful for many fields of application. However, in some cases there is the problem that the locked engagement is separated if the preassembled clamp is caught anywhere during the transportation of the tubular or hose-shaped object. In that case, the preassembled clamp may change its position or alignment on the tubular or hose-shaped object.

SUMMARY OF THE INVENTION

Therefore, it is the primary object of the present invention to provide a clamp which can be reliably preassembled.

In accordance with the present invention, the first leg has a lug which in the opened state protrudes in the direction of the second leg. The second leg includes a fastening section which can be inserted into a gap between the lug and a neighboring portion of the first leg located opposite the lug, wherein, in the closed state of the clamp, the lug is plastically deformed toward the outer side of the fastening section facing away from the first leg.

The configuration according to the present invention makes it possible that a significantly higher safety against an accidental separation of the preassembled clamp can be achieved. In this connection, it should be noted that the "open state" describes a state of the clamp in which the clamp is not yet preliminarily secured to the object, which means that the two legs still have a distance from each other. In addition, the receiving chamber surrounded by the clamp jacket has a greater cross-section than the object. On the other hand, the "closed state" is a state in which the two legs are secured to each other, so that the receiving chamber surrounded by the clamp jacket is adapted to the object in such a way that the clamp jacket rests with a certain pretension against the object. Because the lug is plastically deformed on the fastening section, the lug cannot be separated by a resilient movement.

This measure already increases the safety against an accidental separation of the preliminary mounting. In addition, the fastening section has been guided through a gap between the lug and the neighboring section when the clamp is in a closed state. As a result, lateral yielding of the fastening section is prevented. Any movement is prevented on one side by the lug and on the other side by the neighboring section. Consequently, the mobility of the second leg relative to the first leg is limited to such an extent that an accidental separation is made less possible.

In accordance with an advantageous feature, the fastening section protrudes out of the second leg in a direction toward the first leg. As a result of this feature, a relative movement of the two legs in the direction from the clamp jacket to the end of the legs is reliably prevented. In one direction, the second leg impinges upon the lug. In the opposite direction, the fastening section impinges against the first leg. Since a relative movement of the two legs in the longitudinal direction is prevented, an accidental separation cannot occur as a result of such a relative movement.

According to a preferred feature, the neighboring section is also constructed as a lug which protrudes from the first leg in the direction toward the second leg. In the closed state, the lug forming the neighboring section is plastically deformed toward the other side of the fastening section. As a result, the fastening section is held between two lugs so that a relative lateral movement of the two legs is also prevented. The fastening section is then essentially symmetrically held.

In accordance with another preferred feature, the outer side of the fastening section is offset relative to an outer side of the second leg in the direction toward the first leg which corresponds to a thickness of the lug. The offset does not have to coincide exactly with the thickness of the lug. However, this configuration makes it possible that two plane operational surfaces are obtained at the two legs which are locked together. The clamp can then be assembled with two different orientations, without having any protruding parts.

In accordance with a preferred feature, the fastening section has a curvature which is directed toward the first leg. This curvature increases the mechanical stability of the fastening section. Moreover, the curvature makes it easier to "thread" the fastening section into the gap defined by the lug or lugs. Moreover, the curvature makes it possible that the plastic deformation of the lug or lugs on the outer side of the fastening section, produce a small additional positive engagement which further makes the separation of the locking engagement more difficult.

The fastening section is preferably arranged on a circumferential edge of the second leg. This circumferential edge may be, for example, an edge which is arranged at the end face of the second leg, i.e., at that position which is as far as possible remote from the clamp jacket. However, it may also be an edge at the longitudinal side of the leg. In any event, this position of the edge facilitates a simple manufacture thereof. The fastening section as well as the lug or lugs are then accessible from the outside, so that unnecessary punching procedures are prevented.

The second leg preferably has a recess next to the fastening section, wherein the lug can be inserted in the closed state. This also results in a lateral limitation on the side of the lug located opposite the fastening section, so that this feature provides a further measure for reducing the mobility of the two legs relative to each other.

In accordance with another preferred feature, the lug has along its longitudinal direction a predetermined distance from the first leg. This ensures that the lug can be deformed freely, i.e., without influence from the first leg. There is no danger that the lug gets caught at the first leg which would mean a contradiction to a deformation.

One leg is preferably bent at a right angle relative to the clamp jacket, wherein the clamp has in the bending area thereof a reinforcement in the form of at least one corrugation. At the latest when the clamp is fastened to the support, for example, a wall, a ceiling, etc, the leg which is bent at a right angle is moved toward the second leg, wherein this movement receives a certain resistance by the tubular or cylindrical object. As a consequence, the bent leg is subjected to a strong tensional load which means that there is a significant load acting on the material of the clamp. If a corrugation is provided, the force in the area of the curvature or bend between the bent clamp and the clamp jacket is kept small and the forces are distributed more uniformly over the remaining circumference of the clamp.

The corrugation extends preferably from the end portion completely outwardly. As a consequence, the corrugation can be moved somewhat further into the interior of the clamp as related to the width immediately in the "bend" or the curvature, so that one is not limited to an edge area of the clamp. Since in that case the corrugation extends from the inside toward the outside, it is ensured that sufficient space remains for fastening the head of a threaded bolt.

One leg preferably extends parallel to a tangent of the clamp jacket and is outwardly offset by a predetermined distance. This configuration has particular advantages if the clamp is provided with a rubber-like material in that area where the clamp is to hold the tubular or hose-shaped body. This rubber-like material, for example, of EPDM, engages around the clamp jacket in a C-shape, wherein the back of the C is arranged in the interior of the shell jacket. By outwardly offsetting the tangentially extending leg by a predetermined distance, sufficient space is provided in the area of the clamp jacket for providing the rubber-like material in the engaged area. Therefore, the clamp can be screwed to a support without there being the danger of excess pressure acting on the rubber-like material.

Preferably, a transition section between the leg and the clamp jacket protrudes at least along a section from a transverse direction. In principle, it is sufficient to produce the offset by deforming the material of which the clamp is made by usually a strip of sheet metal, in the transition area in a S-shape or Z-shape. If this deformation is not made uniformly over the transverse direction of the transition section, but the deformation is shaped, for example, V-shaped, a reinforcing corrugation is obtained which increases the bending stiffness of the leg relative to the loads acting during operation, such as torques or vibrations. As a result of this stiffening corrugation, cold hardening is achieved at selected locations by structural changes in the basic material.

At least one leg is preferably provided with a reinforcing plate. In most cases, it would even be sufficient if only a single leg is provided with the reinforcing plate. In that case, the reinforcing plate replaces a conventionally used washer which is arranged between the respective leg and the head of a threaded bolt which is used for fastening the clamp to a support. The reinforcing plate produces an additional stiffening.

The reinforcing plate is preferably formed by a folded extension of the leg. This facilitates the manufacture. It is not necessary to provide additional parts for the manufacture. Rather, a sheet metal strip can be manufactured with an appropriate extension, for example, by punching. The reinforcing plate is then simply bent by 180° onto the remainder of the strip and is connected to the strip, so that the leg is provided with the reinforcing plate.

In this connection, it is provided that the reinforcing plate and the leg have a rivet-like connection. Such a rivet-like connection can be easily carried out in a press or punching machine, so that after the extension has been folded over, it is basically only necessary to carry out a single work step for connecting the reinforcing plate to the leg.

Preferably, of the two parts reinforcing plate and leg each has a throughopening and the material of one of the parts is deformed through the throughopening of the other part. In this manner, it is possible to produce the rivet-like connection. For this purpose, the two parts can be provided, for example, with throughopenings having different diameters wherein the edge of the smaller throughopening is then deformed into the inner circumference of the larger throughopening, so that a positive engagement is achieved which ensures a sufficient fastening.

In accordance with a preferred feature, the throughopening has a shape which deviates from a circular shape. This additionally ensures that the reinforcing plate, which incidentally has at least approximately the same shape as the leg, is non-rotatably secured on the leg. Particularly toward the end of a screwing process, a partially significant torque acts from the screw head onto the reinforcing plate which can be absorbed to a sufficient extent by the shape of the throughopening which deviates from the circular shape. The throughopening may simply be an oblong hole. However, the throughopening may also be provided with a polygonal circumferential edge.

The reinforcing plate preferably has at its rear edge facing the clamp jacket an angled portion. This results in a reinforcement of the rear edge of the reinforcing plate, so that it is possible to achieve a strength which is equal to that of a standard reinforcing plate even though the material used for the reinforcing plate corresponds to that of the clamp jacket and the legs, which normally has low strength. The corrugations mentioned above can be arranged additionally or exclusively in the angled portion of the reinforcing plate.

The reinforcing plate preferably covers the fastening section. This results in the advantage that the reinforcing plate can be used for bending down and plastically deforming the lug or lugs onto the outer side of the fastening section. The reinforcing plate then covers the ends of the lug, so that the danger of an accidental catching or bending of the lugs is kept small.

Each leg preferably has a bend, wherein, in the closed state, one leg is placed with its bent in the bent of the other leg. This makes it possible to prevent changing directions of assembly of the tubular or hose-shaped object.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

BRIEF DESCRIPTION OF THE DRAWING

In the drawing:

FIG. 1 is an elevational view of a first embodiment of a clamp according to the present invention, shown in the closed state;

FIG. 2 is an elevational view of the clamp of FIG. 1 shown in the open state;

FIG. 3 is a sectional view on a larger scale, of a locking mechanism of the clamp in the opened state, taken along sectional line III-III of FIG. 5;

FIG. 4 is a sectional view on a larger scale, of a locking mechanism of the clamp in the closed state;

FIG. 5 is a sectional view taken along sectional line V-V of FIG. 3;

FIG. 6 is a top view of a strip for manufacturing the clamp of FIGS. 1 and 2;

DETAILED DESCRIPTION OF THE INVENTION

Figure 7:
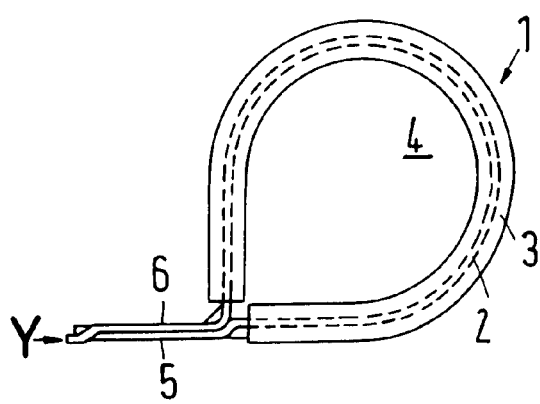
FIG. 7 is an elevational view of a second embodiment of a clamp, shown in the closed state.
Figure 8:
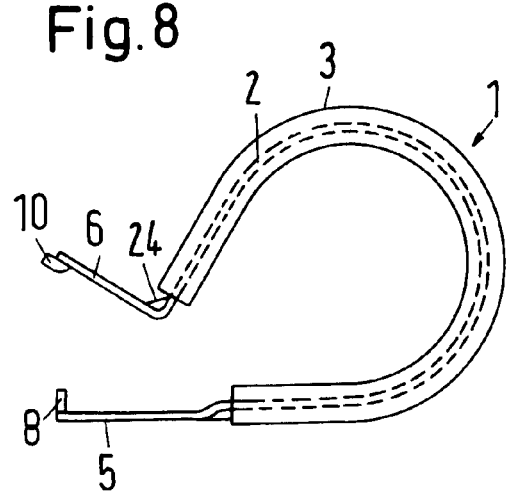
FIG. 8 is an elevational view of the clamp of FIG. 7 shown in the open state.

FIGS. 1 and 2 of the drawing show a clamp 1 with a C-shaped clamp jacket 2 which is lined with a rubber-like material 3, for example, EPDM, and which surrounds a receiving chamber 4. The closed or essentially closed state, as shown in FIG. 1, the receiving chamber 4 has an essentially circular circumferential wall, so that a tubular or hose-shaped object can be secured in the receiving chamber 4 when the clamp 1 is closed.

The clamp 1 includes a first leg 5 which extends essentially along a straight line from the clamp jacket 2. The clamp further includes a second leg 6 which is bent at a right angle relative to the clamp jacket 2. On the second leg 6, i.e., on the side facing away from the first leg, the second leg 6 is provided with a reinforcing plate 7.

If the clamp 1 is open, as illustrated in FIG. 2, the clamp 1 can be pushed into the tubular or hose-shaped object, which is not illustrated in detail. By pressing the two legs 5,6 together, the clamp 1 is preliminarily secured on this object. In order to maintain this connection, the first leg 5 has two lugs 8, 9 which are bent from the first leg 5 in the direction toward the second leg 6. As can be seen in FIG. 6, the two lugs 8, 9 have along the longitudinal extension thereof a certain distance from the remainder of the first leg 5. The lugs are connected to the first leg 5 only at their relatively narrow end faces.

The second leg 6 has a fastening section 10 which is bent out of the second leg 6 in the direction toward the first leg 5, wherein the second leg 6 is bent approximately by the thickness of the sheet metal strip 11 of which the clamp 1 is formed.

The fastening section 10 has a slight curvature 12 which is directed toward the first leg 5 when the two legs 5, 6 are still separated from each other.

However, the curvature of the fastening section can also be omitted, in order to obtain a completely plane assembly surface at the bottom side in relation to the illustration of FIG. 4 when the clamp 1 is in the closed state, i.e., in the preliminarily secured state.

The reinforcing plate 7 is formed by a projection 13 of the sheet metal strip 11 of which the clamp 1 is manufactured. The projection 13 is connected through a joint section 14 to the sheet metal strip 11, wherein the joint section 14 has recesses 15 which separate the sheet metal strip 11 from the projection 13 in order to form a material bridge which is as thin as possible. The sheet metal strip 11 shown in FIG. 6 can be manufactured with its projection 13 in a punching process, wherein the two lugs 8, 9 and the fastening section 10 are also produced. Subsequently, the projection 13 is folded onto the sheet metal strip 11 in order to produce the reinforcing plate 7 in this manner. The reinforcing plate 7 then covers the fastening section 10 at a distance which corresponds approximately to the thickness of the lugs 8, 9.

The projection 13 has an oblong hole 16. The sheet metal strip 11 has a throughopening 17 which is smaller than the oblong hole 16. As can be seen from FIG. 5, an annular portion 18 of the second leg 6 is then deformed through the oblong hole 16, so that a type of rivet connection is formed. The annular portion 18 may additionally include a small flange 19 which engages over the reinforcing plate 7 on the outer side thereof, so that the reinforcing plate 7 is positively engaged with the second leg 6.

As soon as the connection between the second leg 6 and the reinforcing plate 7 has been effected, a cut can be performed along a broken line 20 in order to finally form the second leg 6 with reinforcing plate 7.

The first leg 5 also has a throughopening 21 which, when the two legs 5, 6 rest against each other, are in alignment with the throughopening 17 which is also constructed as an oblong hole, so that a fastening element, for example, a screw, can be guided through in order to be able to fasten the clamp 1 to a support, for example, a girder, a ceiling, a wall, a housing or the like.

The reinforcement plate 7 has at its end facing the clamp jacket 2 a bent portion 22 which serves as an additional reinforcement. A broken line 23 in FIG. 6 shows where the section 22 is bent.

The bent portion 22 may additionally be provided with reinforcing corrugations 24 in order to further increase the bending stiffness of the second leg 6 which is provided with the reinforcing plate 2. The bent portion 22 can be produced before or during the folding over of the reinforcing plate onto the second leg 6. By providing the reinforcing plate 7 with the bent portion 22, it is prevented that the reinforcing plate 7 has a notch effect on the leg 6. There are no sharp edges at the end of the reinforcing plate 7 which could dig into the leg 6 which could under unfavorable circumstances with vibrations lead to an intended breaking point.

Even if the reinforcing plate 7 is provided, the complete clamp 1 can be handled during its manufacture practically as a single piece which is punched from a sheet metal strip. This results in significant advantages in the manufacture of the clamp.

Preliminarily securing the clamp 1 to the object which is not illustrated in detail, initially the two legs 5, 6 are moved toward each other to the extent as it is illustrated in FIG. 3. During the movement which leads to the state shown in FIG. 3, the fastening section 10 has been guided through a gap between the two lugs 8, 9. In this process, the two lugs 8, 9 impinge upon the reinforcement plate 7. A further movement is initially not possible; rather, further movement is only possible if the two legs 5, 6 are pressed against each other at a greater force.

When the two legs 5, 6 are further pressed together, for example, by means of pliers, the two lugs 8, 9 are plastically bent and deformed into a space 25 which is formed between the reinforcing plate 7 and the fastening section 10. As a result, the two legs 5, 6 are locked together and the clamp 1 is preliminarily secured.

If pliers are used for pressing together the legs 5, 6, it is advantageous if these pliers have at one of the jaws thereof a pin-like projection which is guided through the two throughopenings 17, 21. This projection then ensures that the two legs 5, 6 are secured relative to each other. These pliers can then simultaneously be used for bending over the two lugs 8, 9. The clamp 1 does not have to be preliminarily secured. Rather, the clamp 1 can also be used as a "conventional" clamp. In that case, when the clamp 1 is fastened, the worker guides a screw through the two throughopenings 17, 21 and secures the clamp 1 to a support, not illustrated in detail. During this fastening process, the lugs 8, 9 are also deformed. However, this plays practically no role in the further manipulation of the clamp 1.

In addition to flat pliers which are actuated manually, the tool used for preliminary securing can also be pliers which are operated by auxiliary force, for example, pneumatically. When a large number of clamps are manufactured, it is also possible to use an assembly device which can be operated pneumatically or hydraulically. Also a mechanical actuation by other forces would be possible.

This results in a locking action against a movement of the two legs 5, 6 relative to each other in practically all degrees of freedom. A movement of the two legs 5, 6 beyond the mutual contact is not possible. A movement in the opposite direction is also not possible because the two lugs 8, 9 are secured with positive engagement on the fastening section 10.

A movement of the two legs 5, 6 in the longitudinal direction, as seen in FIG. 1 from left to right and from right to left, is not possible because the fastening section 10 contacts in one direction the first leg 5 and the in the other direction the lugs 8, 9. A lateral movement, as seen in FIG. 3 from left to right or from right to left is also not possible because the fastening section 10 is secured in the lugs 8, 9. Similar considerations apply to possible rotational movements of the two legs 5, 6 relative to each other.

The first leg 5, which is arranged essentially tangentially relative to the clamp jacket 2, is slightly outwardly offset relative the exclusively tangential direction. A transition section 27 ensures an offset in such a way that the rubber-like material 3 is not pressed when the first leg 5 is tightly screwed onto a support.

As can be seen in FIG. 6, the transition section 27 is not formed uniformly over the width of the sheet metal strip 11; rather, the transition section extends V-shaped as seen in the top view. This results in a corrugation 28 which contributes to stiffening of the transition section 27.

In the configuration of the clamp as illustrated in FIGS. 1 to 6, flat assembly surfaces are available on both sides of the legs 5, 6, which means that the worker can freely choose during the assembly with what orientation he wants to mount the clamp 1. The surface formed on the outer side of the first leg 5 is flat without any harmful protruding parts, and the outer side of the reinforcing plate 7 is also flat. The corrugation 24 is arranged so closely adjacent the clamp jacket 2 that it is not in the way during the assembly. Consequently, the clamp 1 can be used very flexibly. The curvature of the fastening section 10 is practically also not in the way because it protrudes only by a few tenth of a millimeter. If this should also be in the way, it is also possible to manufacture the fastening section 10 without curvature.

FIGS. 7 to 11 of the drawing show a modified embodiment of the clamp 1 in which the reinforcing plate 7 has been omitted. This type of clamp 1 constitutes a lighter embodiment which can be used for securing lighter objects. Lighter objects exert lower forces on the clamp 1. Equivalent elements are provided with the same reference numerals as in FIGS. 1 to 6.

In contrast to the embodiment of FIGS. 1 to 6, a corrugation 24 is arranged immediately in that area where the second leg 6 is bent away from the clamp jacket 2. However, the corrugation 24 has the same purpose as the corrugation 24 in FIG. 5.

Figure 9:
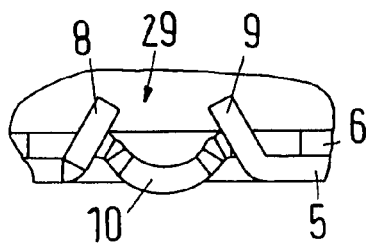
FIG. 9 is a view in the direction of arrow Y, with the clamp in the open state.
Figure 10:
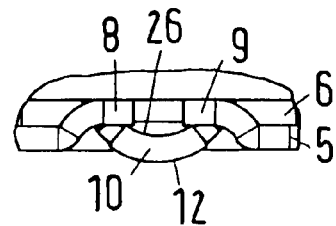
FIG. 10 is a view in the direction of arrow Y, with the clamp in the closed state.

As can be seen in FIGS. 9 and 10, the fastening section 10 can be guided through a gap 29 between the two lugs 8, 9 when the two legs 5, 6 are placed on each other. In this embodiment, the two lugs 8, 9 can be bent onto the outer side 26 of the fastening section 10, for example, by means of pliers. The pliers advantageously have a cylindrical projection with an inclined tip at one of the jaws of the pliers and a throughopening at the other jaws of the pliers, so that the two throughopenings 17, 21 can be engaged by the cylindrical projection and the two legs 5,6 can be held in their position, while the two lugs 8, 9 are bent onto the fastening section 10. It is also in this case possible to omit the curvature of the fastening section 10 or straighten the curvature once again once the lugs 9, 10 are bent by means of a suitable tool, for example, pliers.

It is also possible in this embodiment to ensure that the outer side of the second leg 6 as well as the outer side of the first leg 5 are flat so that two assembly surfaces are available at the clamp 1 and the clamp 1 can be mounted in any desired orientation.

When preliminarily securing this clamp 1, it is also advantageous to use flat pliers or a similar tool which advantageously has a pin-like projection which can be guided through the two throughopenings 17, 21 for positioning the two legs 5, 6 relative to each other in such a way that the fastening section 10 can be guided through the opening between the two lugs 8, 9.

Figure 11:
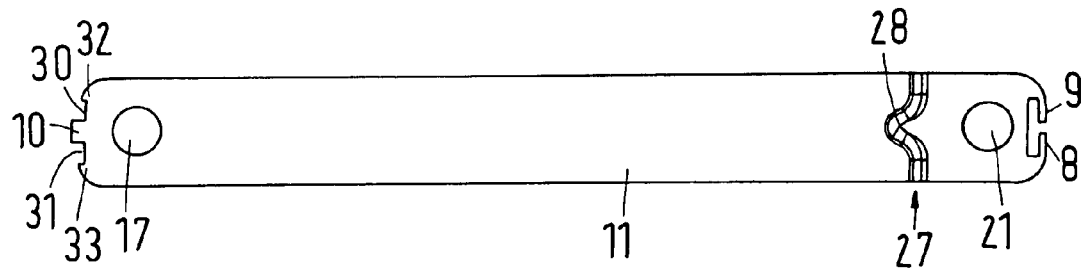
FIG. 11 is a top view f a strip for manufacturing the clamp of FIGS. 7 and 8.

As can be seen particularly in FIG. 11, two recesses 30, 31 are arranged adjacent the fastening section 10. The two lugs 8, 9 are guided into the two recesses. The recesses 30, 31 are at their outer sides delimited by projections 32, 33, so that the two legs 5, 6 can be additionally secured relative to each other. The same configuration is also provided in the embodiment of FIGS. 1 to 6.

Figure 12:
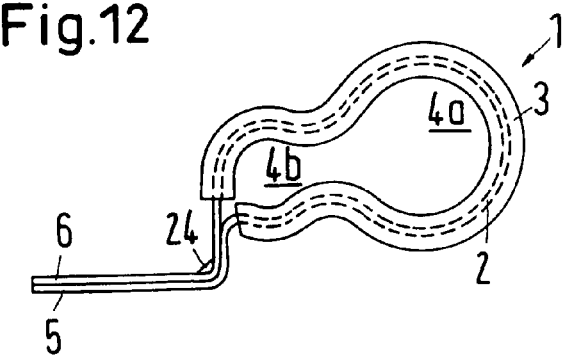
FIG. 12 is an elevational view if a third embodiment of a clamp.
Figure 13:
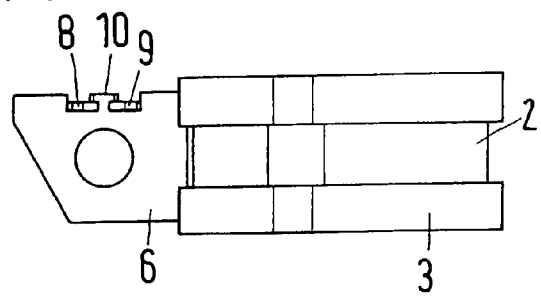
FIG. 13 is a top view of the clamp of FIG. 12.

While in the two embodiments of the locking mechanism illustrated in FIGS. 1 through 11 the locking mechanisms are formed by the lugs 8, 9 and the fastening section 10 at the end faces of the two legs 5, 6. FIGS. 12 and 13 show an embodiment in which the locking mechanism with the lugs 8, 9 and the fastening section 10 is arranged at a longitudinal edge of the two legs 5, 6. The same elements and elements corresponding to each other are provided with the same reference numerals.

The clamp 1 according to FIG. 12 has two receiving chambers 4a, 4b, so that it is possible to secure two tubular or cylindrical objects with one clamp.

As can be seen in FIG. 13, the rubber-like material 3 is not closed on the outer side of the clamp jacket 2; rather, the gap remains through which the clamp jacket 2 is visible.

Figure 14:
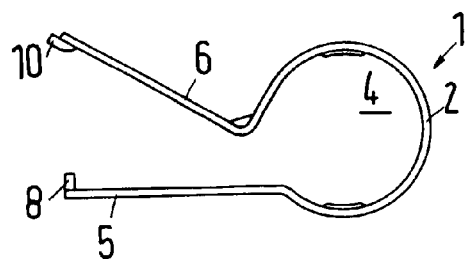
FIG. 14 is an elevational view of a fourth embodiment of a clamp, shown in the open state.
Figure 15:
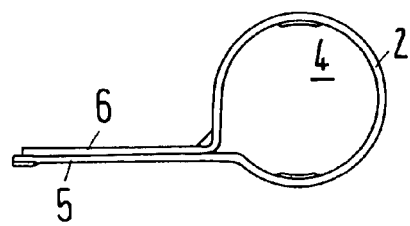
FIG. 15 is an elevational view of the clamp of FIG. 14, shown in a closed state.
Figure 16:
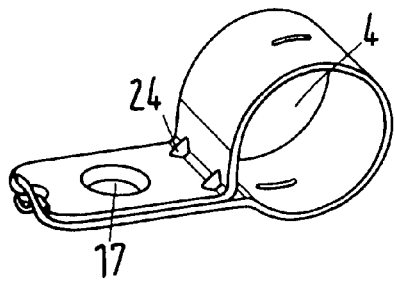
FIG. 16 is a perspective view of a clamp according to FIG. 15.

FIGS. 14 through 16 show another embodiment of a clamp 1 which essentially is of the same construction as the clamp of FIGS. 7 through 11. However, the rubber-like material 3 is omitted.

Figure 17:
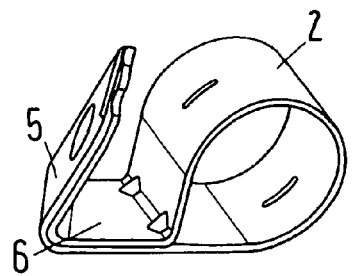
FIG. 17 is a perspective view of a fifth embodiment of a clamp.

FIG. 17 shows a clamp in which the legs 5, 6 each have a bend, wherein the bends are configured in such a way that when the legs 5, 6 are resting against each other they have essentially a common bend. In that case, the outer side of one bend rests against the inner side of the other bend.

Figure 18:
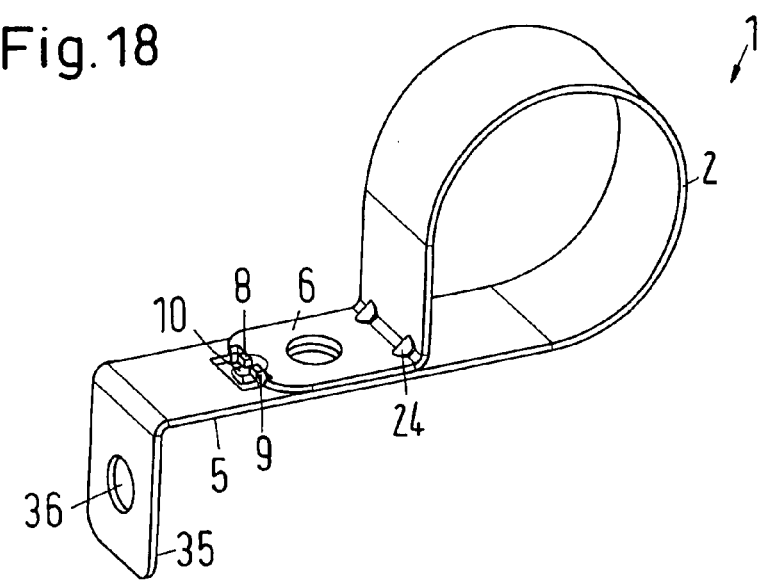
FIG. 18 is a perspective view of a sixth embodiment of the clamp.
Figure 19:
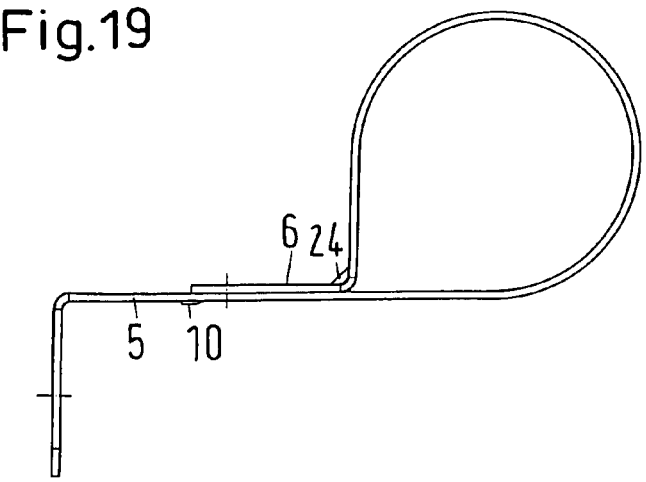
FIG. 19 is an elevational view of the clamp of FIG. 18.
Figure 20:
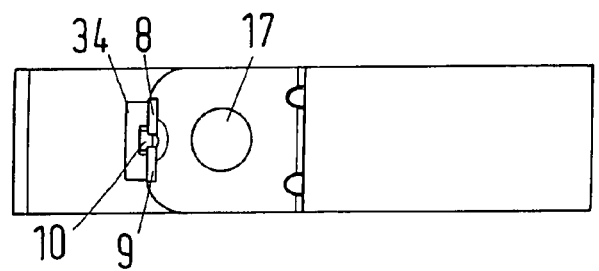
FIG. 20 is a top view of the clamp of FIG. 18.

FIGS. 18 through 20 show a sixth embodiment of clamp 1, wherein equal elements and corresponding elements are provided with the same reference numerals as in FIGS. 1 through 17.

First, in the embodiment of FIGS. 18 through 20, one leg 5 is extended beyond the other leg 6; in other words, the leg 5 protrudes in the longitudinal direction beyond the leg 6.

Consequently, the lugs 8, 9 are not arranged at a circumferential edge of the leg 5; rather, the lugs 8, 9 are formed in an opening 34 which is provided in the middle of the leg 5. Otherwise the clamp 1 of this embodiment can also be preliminarily secured or preassembled as is the case in the clamps of FIGS. 1 through 17.

The clamp 1 can be fastened on a base in two ways. First, throughopenings 17, 21 are provided which in preliminarily securing the clamp can also be used for receiving a pin or pin-shaped projection at a locking tool. On the other hand, the leg 5 has in its bent section 35 an additional hole 36 which can also be used for receiving a screw, a bolt or the like.

Figure 21:
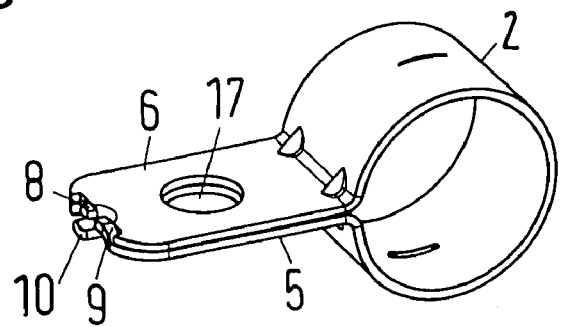
FIG. 21 is a perspective view of a seventh embodiment of a clamp, shown in the closed state.
Figure 22:
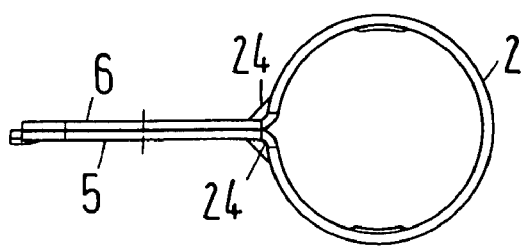
FIG. 22 is an elevational view of the clamp of FIG. 21.
Figure 23:
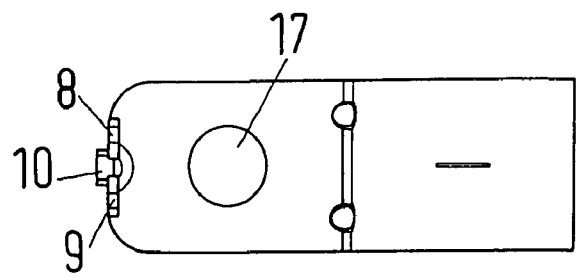
FIG. 23 is a top view of the clamp of FIG. 21.

FIGS. 21 through 23 show a seventh embodiment of the clamp which corresponds essentially to the embodiment of FIGS. 14 to 16.

However, in this embodiment, the two legs 5, 6 protrude essentially in radial direction from the clamp jacket 2. In that case, both legs 5, 6 also have corrugations 24 in order to achieve a stiffening in the transition from the clamp jacket 2 to the legs 5, 6.

In all embodiments, the clamp 1 can be manufactured from a single sheet metal strip, so that particularly only a single part has to be manipulated in the manufacture of the clamp. This is also true if the clamp 1 is provided with a reinforcing plate 7. All embodiments of the clamp 1 can be preliminarily secured without problems, so that the assembly of the clamp 1 is also significantly simplified.

While specific embodiments of the invention have been shown and described in detail to illustrate the inventive principles, it will be understood that the invention may be embodied otherwise without departing from such principles.

We claim:

1. A clamp for securing a tubular or hose-shaped object to a support, the clamp comprising a clamp jacket having first and second ends, a first leg projecting from the first end and a second leg projecting from the second end, the first leg having at least one lug projecting in a direction toward the second leg, and the second leg having a fastening section insertable into a gap between the at least one lug and an adjacent area of the first leg located opposite the at least one lug, wherein, in a closed state of the clamp, the at least one lug is plastically deformed onto an outer side of the fastening section facing away from the first leg, wherein the second leg has adjacent the fastening section a recess into which the lug is inserted in the closed state.

2. The clamp according to claim 1, wherein the fastening section protrudes from the second leg in a direction toward the first leg.

3. The clamp according to claim 1, wherein the adjacent area is constructed as a second lug which protrudes from the first leg in a direction toward the second leg, wherein, in the closed state, the second lug is plastically deformed onto the outer side of the fastening section.

4. The clamp according to claim 1, wherein the outer side of the fastening section is offset relative to the outer side of the second leg in a direction toward the first leg by a distance equal to a thickness of the lug.

5. The clamp according to claim 1, wherein the fastening section has a curvature directed toward the first leg.

6. The clamp according to claim 1, wherein the fastening section is arranged at a circumferential edge of the second leg.

7. The clamp according to claim 1, wherein the at least one lug has along a longitudinal direction thereof a predetermined distance from the first leg.

8. The clamp according to claim 1, wherein one of the legs is bent at a right angle from the shell jacket, wherein the clamp has in a bending area a reinforcement by at least one corrugation.

9. The clamp according to claim 8, wherein the corrugation extends from the bending area completely outwardly.

10. The clamp according to claim 1, wherein one leg extends parallel to a tangent of the clamp jacket, wherein the one leg is outwardly offset by a predetermined distance.

11. The clamp according to claim 10, wherein a transition area between the one leg and the clamp jacket deviates at least along a section from a transverse direction.

12. The clamp according to claim 1, wherein at least one leg is provided with a reinforcing plate.

13. The clamp according to claim 12, wherein the reinforcing plate is formed by a folded over extension of the leg.

14. The clamp according to claim 12, wherein the reinforcing plate has an angled area at a rear edge thereof which faces the clamp jacket.

15. The clamp according to claim 12, wherein the reinforcing plate bridges over the fastening section.

16. The clamp according to claim 1, wherein the clamp jacket surrounds a plurality of receiving spaces, whose cross-section is circular.

17. The clamp according to claim 1, wherein each lea has a bend, wherein, while in the closed state of the clamp, the bend of one leg rests in the bend of the other leg.

18. A clamp for securing a tubular or hose-shaped object to a support, the clamp comprising a clamp jacket having first and second ends, a first leg projecting from the first end and a second leg projecting from the second end, the first leg having at least one lug projecting in a direction toward the second leg, and the second leg having a fastening section insertable into a gap between the at least one lug and an adjacent area of the first leg located opposite the at least one lug, wherein, in a closed state of the clamp, the at least one lug is plastically deformed onto an outer side of the fastening section facing away from the first leg, wherein at least one leg is provided with a reinforcing plate, further comprising a rivet connection between the reinforcing plate and the leg.

19. The clamp according to claim 18, wherein the second leg has adjacent the fastening section a recess into which the lug is inserted in the closed state.

20. The clamp according top claim 18, wherein the reinforcing plate and the leg each has a throughopening, and the material of one of the reinforcing plate and the leg is deformed through the throughopening of another of the reinforcing plate and the leg.

21. The clamp according to claim 20, wherein the throughopening has a shape deviating from a circular shape.

* * * * *